United States Patent

Blount

[15] 3,636,342

[45] Jan. 18, 1972

[54] MOUNTING BRACKET FOR PHOTOGRAPHIC FLASHGUNS

[72] Inventor: Richard Blount, South Euclid, Ohio

[73] Assignee: General Electric Company

[22] Filed: Dec. 8, 1969

[21] Appl. No.: 882,961

[52] U.S. Cl. ................................................. 240/52.1, 95/11
[51] Int. Cl. ........................................ F21v 21/08, E01c 5/00
[58] Field of Search ........................... 240/52.1, 52, 73; 95/11

[56] References Cited

UNITED STATES PATENTS

| 746,188 | 12/1903 | Sonsthahen | 240/52.1 X |
|---|---|---|---|
| 2,719,469 | 10/1955 | Sanford | 240/52 |

Primary Examiner—Richard C. Queisser
Assistant Examiner—Ellis J. Koch
Attorney—James J. Lazna, Henry P. Truesdell, Frank L. Neuhauser, Oscar B. Waddell and Joseph B. Forman

[57] ABSTRACT

A bracket for mounting a photographic flashgun on a camera is comprised of complementary front and back slidably interfitted members held together in assembled relation and clamped in place on the camera body by a fastening means.

10 Claims, 6 Drawing Figures

PATENTED JAN 18 1972
3,636,342
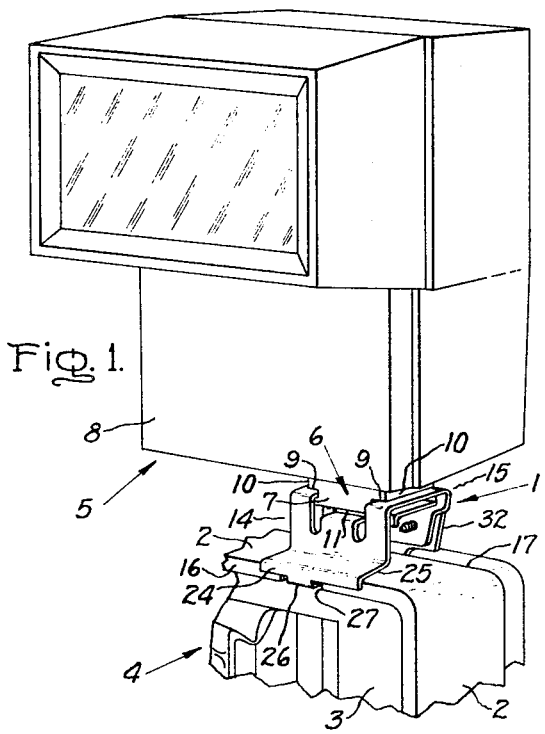
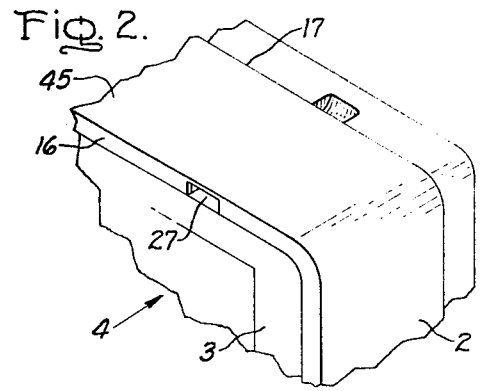
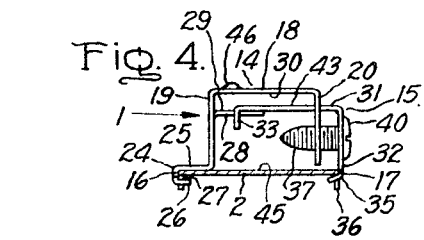
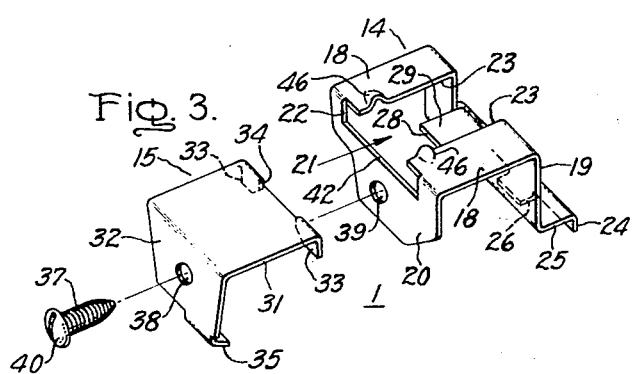
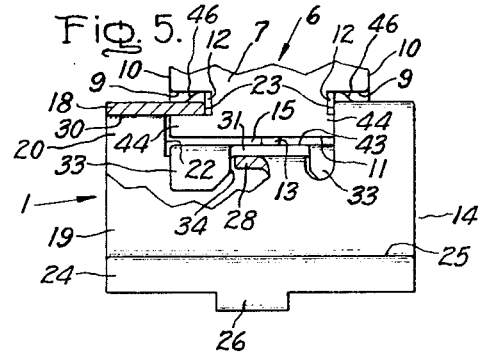
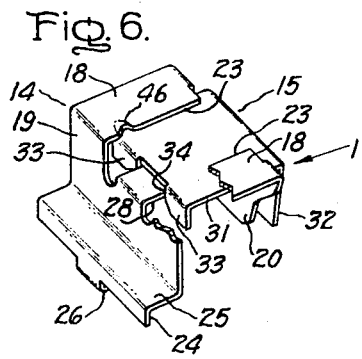
Inventor:
Richard Blount
by James J. Lazna
His Attorney

MOUNTING BRACKET FOR PHOTOGRAPHIC FLASHGUNS

BACKGROUND OF THE INVENTION

1. Field of the Invention

This invention relates to a mounting bracket adapted to be clamped to the body of a camera for releasably mounting a photographic flashgun thereon.

2. Description of the Prior Art

Conventional-type photographic flashguns in general use at present are commonly provided with a mounting foot which is adapted to be slip-fitted onto a bracket or accessory shoe carried on the body portion of the camera to thereby releasably mount the flashgun in operative flashing position on the camera. The mounting brackets or shoes heretofore employed for this purpose have generally been in the form of a single integrated unit either permanently built into the camera casing, or removably fasteneable in place thereon as, for instance, by means of fastening screws, or slidably mountable on a portion of the camera such as, for example, the conventional film rewind knob. The prior removably fasteneable flashgun mounting brackets or shoes, however, have necessitated the provision of specially constructed means on the camera to enable the mounting of the brackets thereon. Accordingly, such prior-type flashgun mounting brackets or accessory shoes generally have not been mountable on those cameras which are not so provided with such specially constructed means for enabling the mounting of the brackets or shoes thereon.

SUMMARY OF THE INVENTION

It is an object of the invention, therefore, to provide a universal-type flashgun mounting bracket or accessory shoe for fastening directly to the casing portion of a camera.

Another object of the invention is to provide a universal-type flashgun mounting bracket or accessory shoe which can be fastened directly to the casing portion of a camera and which will exert a sufficient frictional grip on a flashgun mounted thereon to firmly support the flashgun in proper flashing position on the camera.

Still another object of the invention is to provide a universal-type flashgun mounting bracket or accessory shoe which can be easily and firmly fastened in place on the casing portion of a camera in a position which will assure that the reflector axis of a flashgun mounted on the bracket will be aligned substantially parallel to the axis of the camera lens.

Briefly stated, in accordance with one aspect of the invention, a flashgun mounting bracket is formed of two complementary sheet metal members which slidably interfit with one another so as to be clampable in place on the body of a camera by suitable fastening means such as a fastening screw. The slidably interfitted members are formed to provide a guideway to enable the slip-fitting onto the bracket of a conventional-type flashgun mounting foot to thereby mount the flashgun in place on the camera, and they are further formed to provide a flat camming surface adapted to engage with the customary spring-loaded plunger on the bottom face of the mounting foot to thereby frictionally grip and hold the flashgun firmly in place on the mounting bracket against accidental withdrawal therefrom.

Further objects and advantages of the invention will appear from the following detailed description of a species thereof and from the accompanying drawings.

BRIEF DESCRIPTION OF THE DRAWINGS

In the drawing:

FIG. 1 is a perspective view of a mounting bracket according to the invention shown attached in place on a camera and showing a flashgun mounted in place on the bracket;

FIG. 2 is a fragmentary perspective view of a casing portion of a camera suitably formed for attachment thereto of the mounting bracket comprising the invention;

FIG. 3 is an exploded perspective view of the flashgun mounting bracket;

FIG. 4 is a side elevation of the flashgun mounting bracket shown attached in place on the casing portion of a camera;

FIG. 5 is a front elevation of the flashgun mounting bracket shown partly broken away in section and showing mounted thereon a portion of the mounting foot of a flashgun; and FIG. 6 is a perspective view of the flashgun mounting bracket as seen from the front thereof and shown partly broken away.

DESCRIPTION OF THE PREFERRED EMBODIMENT

The flashgun mounting bracket of the present invention is of a universal type adapted to be firmly but releasably mountable on cameras having a bandlike casing portion and incorporating flash synchronizing means, the mounting bracket enabling a flashgun to be firmly mounted on the camera, or to be detached therefrom, with the utmost ease and rapidity.

Referring to FIG. 1, a mounting bracket 1 according to the invention is there shown attached in place on a bandlike casing portion 2 on the body 3 of a camera 4, with a flashgun 5 provided with a conventional foot portion 6 shown mounted in place on the mounting bracket, the foot portion 6 of the flashgun being slip-fitted onto the mounting bracket in a manner similar to that in which such flashguns have been mounted on previous conventional-type mounting brackets or accessory shoes on cameras. As shown more particularly in FIGS. 1 and 5, such conventional-type flashgun foot portions 6 are generally in the form of a block-shaped housing member 7 projecting from the bottom of the flashgun casing 8 and having a pair of opposed guide grooves 9 formed in its opposite side faces 10 and extending parallel to and closely adjacent the flat bottom face 11 of the foot portion 6. Flat spring fingers or lead springs 12 are mounted in the housing member 7 within the innermost regions of the guide grooves 9 to extend therealong. In addition, a spring-loaded plunger 13 protrudes from the bottom face 11 of the housing member 7 of the foot portion 6.

The flashgun mounting bracket 1 according to the invention is comprised of two complementary sheet metal members, i.e., a front member 14 and a back member 15, which may be made of any suitable metal sheet material such as, for example, sheet steel of around three sixty-fourths inch thickness and preferably plated with a suitable nonoxidizing material such as cadmium, nickel or chromium, and which slidably interfit with one another to enable them to be clamped firmly against the opposite side edges 16 and 17 of the bandlike casing portion 2 of the camera 4 for the purpose of attaching it thereto, as shown in FIGS. 1 and 4. The front member 14 is formed of a strip of such sheet metal bent to generally channel shape to form a web portion 18 with front and rear side flanges 19 and 20, respectively, extending therefrom. The web portion 18 is formed with a transverse guide slot 21 (FIG. 3) extending completely thereacross, with a widened extension 22 at its rear end extending a short distance into the rear side flange 20 of the front member 14, to form a guideway open at its rear end to permit sliding insertion thereinto of the lowermost extremity of the foot portion 6 of the flashgun 5, with the side edges 23 of the portion of the guideway in the web 18 of the front member 14 entered into the guide grooves 9 in the foot portion 6 of the flashgun and engaging with the spring fingers 12 therein so as to deflect them. The resulting spring pressure of the deflected spring fingers 12 against the side edges 23 of the guideway 21 in the front member 14 thus serves to provide a friction grip of the foot portion 6 onto the front member 14 such as tends to hold the flashgun in place on the front member against accidental sliding removal therefrom. The front side flange 19 of the front member 14 is provided at its free end with a forwardly offset portion 24 formed by an outwardly bent wing portion 25 on the flange 19 and terminating in a short inturned tongue or lip portion 26 adapted for insertion into a notch opening 27 in the underside of the bandlike casing 2 of the camera body 3, at the front side edge 16 of the casing, so as to catch around the front side edge of the casing and thus lock the front member 14 in place against tilting movement thereon when it is clamped, together with the back member 15, in position on the casing 2. As shown in FIG. 4, the outwardly bent wing portion 25 of the front member 14 rests flat against the outer side of the casing 2 on the camera body 3 in the mounted position of the mounting bracket 1 thereon, thereby properly positioning the bracket in place thereon.

The front member 14 is formed with an inturned stop lug or tongue portion 28 which is struck from that part of the web portion 18 and front side flange 19 of the front member which is cut out to form the guide slot 21 therein. The stop lug 28 is bent to extend inwardly from the front side flange 19 of the front member 14 in a direction parallel to the web portion 18 thereof, with its outwardly facing flat surface 29 spaced a predetermined distance from the inner side 30 of the web portion 18 of the front member 14 to thereby afford a stop shoulder for engaging with a portion of the rear member 15 to properly position it relative to the front member 14 in the assembled position of these members, as described hereinafter. As will be apparent from the drawing, the stop lug or tongue portion 28 extends from the front side flange 19 of the front member 14 longitudinally of and more or less centrally aligned with the guide slot 21 therein.

The rear member 15 of the mounting bracket 1 is formed of a strip of sheet metal, such as that employed for the front member 14, which is bent to generally L-shape to form a camming leg portion 31 and a clamping leg portion 32. The camming leg portion 31 is of a width such as to have a close tolerance sliding fit within the widened extension 22 of the guide slot 21 in the front member 14 so as to be slidably insertable thereinto and guided therein. At its free end, the camming leg portion 31 of the back member 15 is formed with a pair of spaced inturned guide lugs 33 extending inwardly and more or less perpendicularly therefrom. The spaced guide lugs 33 together provide a guide slot 34 therebetween for slidably receiving the stop lug or tongue portion 28 on the front member 14 with a close tolerance sliding fit so as to guide the free end of the camming leg portion 31 of the back member 15 and thus align the two members 14 and 15 in proper position for clamping to the casing 2 of the camera body 3. The guide lugs 33 preferably are of a length slightly greater than the length (or height) of the widened guide slot portion 22 in the rear side flange 20 of the back member 15 so as to catch behind the rear side flange 20 to prevent the slidably interfitted members 14 and 15 from being freely separable from one another by relative sliding movement in a direction lengthwise of the guideway 21 in the front member 14. Thus, the slidably interfitted members 14 and 15 are separable from one another, and can be slidably interfitted together, only by tilting or angling them relative to one another.

The free end of the clamping leg portion 32 of the back member 15 is formed with an inturned tongue or lip portion 35 corresponding to and located in opposed relation to the inturned tongue or lip portion 26 on the front member 14, in the assembled position of the two members 14 and 15. The inturned tongue 35 is adapted for insertion into a notch opening 36 (FIG. 4) formed in the underside of the bandlike casing 2 of the camera at the rear side edge 17 thereof and corresponding to and aligned with the notch opening 27 at the front side edge 16 of the casing 2, so as to catch around the rear side edge 17 of the casing 2 to lock the back member 15 in place against tilting movement thereon when it is clamped, together with the front member 14, in position on the casing 2.

To hold the two members 14 and 15 together in assembled position and clamp them firmly against the opposite side edges 16 and 17 of the casing 2 on the camera so as to secure the mounting bracket 1 in place thereon, suitable fastening means are employed which conveniently may take the form of an adjustment or clamping screw 37 loosely passing through an aperture 38 (FIG. 3) in the clamping leg portion 32 of the back member 15 and having screw-threaded engagement within a threaded aperture 39 in the rear side flange 20 of the front member 14. When the fastening screw 37 is turned so as to screw it into the screw-threaded opening 39 in the front member 14, the head 40 of the fastening screw engages the clamping leg 32 of the back member 15 and forces it forwardly toward the rear side flange 20 of the front member 14, thereby slidably moving the two members 14 and 15 toward one another until they engage with and become tightly clamped against the opposite side edges 16, 17 of the bandlike casing 2 on the camera body 3, thus securely fastening the mounting bracket 1 in place on the camera 4.

In the slidably interfitted and assembled position of the two bracket members 14 and 15, the camming leg portion 31 of the back member 15 engages and rests at its free end on the outwardly or upwardly facing side 29 of the stop lug or tongue portion 28 on the front member, and at its other end on the end 42 (FIG. 3) of the widened guide slot portion 22 in the rear side flange 20 of the front member, to thereby support and locate the back member 15 in proper squared position relative to the front member 14, as shown in FIG. 4, with its camming leg portion 31 disposed parallel to the web portion 18 of the front member. To this end, the outwardly or upwardly facing side 29 of the stop lug or tongue portion 28 on the front member, and the end 42 of the widened guide slot portion 22 therein, are disposed parallel to one another and to the inner side 30 of the web portion 18 of the front member 14. In addition, these surfaces 29 and 42 are spaced a predetermined distance from the inner side 30 of the web portion 18 such as to likewise position the outwardly or upwardly facing side 43 of the camming leg portion 31 of the back member 15, when resting against these surfaces 29 and 42 in the assembled position of the two bracket members 14 and 15, at a predetermined distance, from the inner side 30 of those portions of the web portion 18 at each side of the guideway 21 which overlie the camming leg portion 31 of the back member 15, sufficient to freely accommodate in the space therebetween the entire thickness of the lip portions 44 (FIG. 5) formed on the foot portion 6 of the flashgun casing by the guide slots 9 therein, but less than the total of the thickness of such lip portions 44 plus the distance the spring-loaded plunger 13 projects, when in its fully extended or undeflected position, from the bottom face 11 of the foot portion 6 on the flashgun casing 8. This particular predetermined spacing of the outer or upwardly facing side 43 of the camming leg portion 31 of the back member 15 from the inner or underside 30 of the web portion 18 of the front member 14 thus permits the sliding insertion therebetween of the lip portions 44 of the flashgun foot portion 6 when the latter is slidably inserted into the guideway 21 of the assembled mounting bracket 1, as shown in FIG. 5. In addition, it also causes the spring-loaded plunger 13 projecting from the bottom face 11 of the foot portion 6 to engage with and become depressed by the camming leg portion 31 of the back member 15 on slidable insertion of the foot member into the guideway 21 in the front member 14. This depression of the spring-loaded plunger 13 then causes the lip portions 44 on the foot portion 6 to be spring-pressed firmly against the inner side 30 of the overlying portions of the web 18 of the front member 14, thereby producing a frictional grip therebetween serving to hold the foot portion 6 firmly in position on the mounting bracket 1 and thus supporting the associated flashgun securely in place on the camera 4. To prevent wobbling of the flashgun 5 on the bracket 1 such as might otherwise result from any slight tolerance existing between the thickness of the edge portions 23 of the guideway 21 in the front member 14 and the width of the guide grooves 9 in the flashgun foot portion 6, the web portion 18 of the front member 14 is formed with a pair of small outward protuberances or hump-shaped offsets 46 in the edge portions 23 of the guideway 21 located near the forward end of the latter approximately opposite one another and of a height or outward projection such as to snugly fit within the guide grooves 9.

In assembling the two complementary members 14 and 15 together to form the mounting bracket 1, the free end of the camming leg 31 of the back member 15 is first slidably inserted into the widened guide slot portion 22 in the front member 14, the two members 14, 15 initially being tilted at a slight angle to one another to permit the entry of the inturned guide lugs 33 on the back member 15 into the widened guide slot portion 22 of the front member. The two members 14, 15 are then slidably moved toward one another a sufficient distance to permit the stop lug or guide tongue 28 on the front member 14 to be inserted into the guide slot 34 in the back member 15 formed by the inturned guide lugs 33 thereon. During this sliding assembly movement of the two members 14, 15, the close tolerance sliding fits of the camming leg portion 31 within the widened extension 22 of the guideway 21 in the front member, and of the stop lug 28 on the front member 14 within the guide slot 34 in the back member 15, serves to respectively align the two members 14, 15 and their fastening screw apertures 38, 39 laterally relative to one another. Resting engagement of the camming leg portion 31 of the back member 15 on the outward or upper side 29 of the stop lug 28 on the front member 14, and on the end 42 of the widened guide slot portion 22 in the back side flange 20 of the front member, serves to align the two members 14, 15 in the transverse plane of the channel-shaped front member 14 so that the fastening screw apertures 38 and 39 are aligned in the said transverse plane and the camming leg portion 31 of the back member 15 extends parallel to the web portion 18 of the front member 14. With the two members 14, 15 thus slidably interfitted together in assembled position, the tapered end of the fastening screw 37 is then inserted through the opening 38 in the back member and screwed into the aligned screw-threaded opening 39 in the front member 14 to thereby connect and hold the two members 14, 15 together in slidably interfitted relation with one another.

To mount the bracket 1 in place on the camera 4, it is placed over and against the bandlike casing 2 of the camera 4 with the outwardly bent wing portion 25 of the front member 14 resting flat against the casing 2 and with the inturned tongue 35 on the back member 15 entered in the positioning notch 36 in the back edge 17 of the casing 2. The adjustable fastening screw 37 is then turned to tighten it an and thereby slidably close the two bracket members 14, 15 together until the inturned tongue 26 on the front member 14 catches in the positioning notch 27 in the front edge 16 of the casing 2 and the offset free end 24 of the front side flange 19 of the front member 14 and the clamping leg portion 32 of the back member 15 engage with and become tightly clamped against the edges 16 and 17 of the casing 2.

Since the flat upper surface 45 (FIG. 4) of the bandlike casing 2 on the body 3 of the camera 4 is disposed approximately parallel to the axis of the camera lens (not shown), and the side edges 16, 17 of the casing are disposed in planes normal to the lens axis, and further since the guide slots 9 in the foot portion 6 of conventional-type flashguns 5 extend approximately parallel to the reflector axis thereof, the mounting of the bracket 1 on the camera casing 2 with the lateral bent wing portion 25 of its front member 14 resting flat against the camera casing 2, as shown in FIG. 4, therefore assures that the web portion 18 of the mounted bracket 1 will be disposed approximately parallel to the flat upper surface 45 of the camera casing 2 so that the flashgun 5 accordingly will be mounted, in turn, on the camera 4 with its reflector axis extending approximately parallel to the axis of the camera lens. Moreover, because of its two-part construction comprised of the two complementary members 14 and 15 slidably adjustable relative to one another, the mounting bracket 1 according to the invention therefore is of adjustable character such as adapts it for universal application to many different types of cameras having different width casings 2.

What I claim as new and desire to secure by Letters Patent of the United States is:

1. A bracket for releasably mounting a flashgun by a depending foot portion thereof on a bandlike casing portion of a camera, said bracket comprising complementary front and back sheet metal members, said front member comprising a channel-shaped portion provided with a transverse guide slot in its web portion having a widened extension at one end located in the adjacent rear side flange of said front member, said guide slot forming a guideway open at the said one end for slidably receiving, through the said open end and widened slot extension, the said foot portion of the flashgun with the side edges of the guideway in said web portion received within cooperating guide grooves in the opposite side faces of said foot portion to thereby support the latter in place on said front member, said back member having at least a portion thereof disposed alongside and spaced outwardly from the said rear side flange of said front member, one of said members having a flat camming surface portion extending along the said guideway in the front member and facing toward and disposed parallel to but spaced inwardly from the inner side of the web portion of said front member a predetermined distance to engage with and depress a spring-loaded plunger mounted on and projecting from the bottom face of said foot portion on sliding insertion movement of said foot portion into the said guideway of said front member, and fastening means interconnecting said members for adjustment movement of said members relative to one another to clamp a free end of said back member and the free end of the front side flange of said front member against the opposite side edges of said camera casing so as to firmly secure the bracket in place thereon, said back member and the free end of the front side flange of said front member being formed with opposed inturned lip portions adapted to catch around the opposite side edges of the said bandlike casing of the camera, on clamping of the said members thereagainst by the said fastening means, to thereby lock the bracket securely in place against tilting movement on said casing.

2. A bracket as specified in claim 1 wherein the said fastening means comprises an adjustment screw passing through an aperture in the said back member and screw threaded into the rear side flange of said front member.

3. A bracket as specified in claim 1 wherein the said free end of the front side flange of said front member is offset outwardly thereof.

4. A bracket for releasably mounting a flashgun by a depending foot portion thereon a bandlike casing portion of a camera, said bracket comprising complementary front and back sheet metal members slidably interfitting with one another, said front member comprising a channel-shaped portion provided with a transverse guide slot in its web portion having a widened extension at one end located in the adjacent rear side flange of said front member, said guide slot forming a guideway open at the said one end for slidably receiving, through the said open end and widened slot extension, the said foot portion of the flashgun with the side edges of the guideway in said web portion received within cooperating guide grooves in the opposite side faces of said foot portion to thereby support the latter in place on said front member, said back member being L-shaped with one of its leg portions slidably insertable through the said widened slot extension in the said rear side flange of said front member and the other one of its leg portions disposed alongside and outwardly of the said rear side flange, one of said members having a flat camming surface portion extending along the said guideway in the front member and facing toward and disposed parallel to but spaced inwardly from the inner side of the web portion of said front member a predetermined distance to engage with and depress a spring-loaded plunger mounted on and projecting from the bottom face of said foot portion on sliding insertion movement of said foot portion into the said guideway of said front member, and fastening means interconnecting said members for slidable adjustment movement of said back member relative to said front member within the said widened slot extension thereof to clamp the free end of the front side flange of the front member and the free end of the said other leg portion of the back member against the opposite side edges of said camera casing so as to firmly secure the bracket in place thereon, the free end of the front side flange of said front member and the free end of the said other leg portion of the back member being formed with opposed inturned lip portions adapted to catch around the opposite side edges of the said bandlike casing of the camera, on clamping of the said members thereagainst by the said fastening means, to thereby lock the bracket securely in place against tilting movement on said casing.

5. A bracket as specified in claim 4 wherein the said fastening means comprises an adjustment screw passing through an aperture in the said other leg portion of the back member and screw threaded into the rear side flange of said front member.

6. A bracket as specified in claim 4 wherein the said flat camming surface portion is constituted by that surface of the said one leg portion of said back member that faces the web portion of the front member, said one leg portion of the back member abutting at its free end against a stop shoulder on the front side flange of said front member and at its other end against the end of the said widened slot extension in the rear side flange of said front member to thereby locate the said camming surface portion at the said predetermined distance from and parallel to the inner side of the web portion of said front member.

7. A bracket for releasably mounting a flashgun by a depending foot portion thereof on a bandlike casing portion of a camera, said bracket comprising complementary front and back sheet metal members slidably interfitting with one another, said front member comprising a channel-shaped portion provided with a transverse guide slot in its web portion having a widened extension at one end located in the adjacent rear side flange of said front member, said guide slot forming a guideway open at the said one end for slidably receiving, through the said open end and widened slot extension, the said foot portion of the flashgun with the side edges of the guideway in said web portion received within cooperating guide grooves in the opposite side faces of said foot portion to thereby support the latter in place on said front member, said front member having a stop lug portion extending inwardly from its front side flange approximately parallel to but spaced inwardly from the inner side of its web portion, said back member being L-shaped with a camming leg portion insertable through and having a sliding fit within the said widened slot extension in the said rear side flange of said front member and a clamping leg portion disposed alongside and outwardly of the said rear side flange, the same camming leg portion of said back member having a flat camming surface portion extending along the said guideway in the front member and facing toward the inner side of the web portion of said front member, said camming leg portion abutting at its free end against the said stop lug portion of said front member and at its other end against the end of the said widened slot extension in the rear side flange of said front member to thereby locate the said camming surface portion a predetermined distance inwardly from and parallel to the inner side of the web portion of said front member to engage with and depress a spring-loaded plunger mounted on and projecting from the bottom face of said foot portion on sliding insertion movement of said foot portion into the said guideway of said front member, and fastening means interconnecting said members for slidable adjustment movement of said back member relative to said front member within the said widened slot extension thereof to clamp the free end of the front side flange of the front member and the free end of the said clamping leg portion of the back member against the opposite side edges of said camera casing so as to firmly secure the bracket in place thereon, the free end of the front side flange of said front member and the free end of the said clamping leg portion of the back member being formed with opposed inturned lip portions adapted to catch around the opposite side edges of the said bandlike casing of the camera, on clamping of the said members there against by the said fastening means, to thereby lock the bracket securely in place against tilting movement on said casing.

8. A bracket as specified in claim 7 wherein the said stop lug on the front member and the said camming leg portion of the back member are provided with tongue and groove sliding interfit means thereon to guide the free end of the said camming leg of the back member during the sliding movement of said camming leg within the said widened slot extension of the front member.

9. A bracket as specified in claim 8 wherein the said tongue and groove sliding interfit means comprises a guideway on the free end of the said camming leg portion of the back member into which the said stop lug extends and is slidable to thereby guide the free end of the said camming leg portion.

10. A bracket as specified in claim 9 wherein the said fastening means comprises an adjustment screw passing through an aperture in the said clamping leg of the back member and screw threaded into the rear side flange of said front member.

* * * * *